(12) United States Patent
Chow et al.

(10) Patent No.: US 6,571,387 B1
(45) Date of Patent: May 27, 2003

(54) METHOD AND COMPUTER PROGRAM PRODUCT FOR GLOBAL MINIMIZATION OF SIGN-EXTENSION AND ZERO-EXTENSION OPERATIONS

(75) Inventors: Frederick Chow, Fremont, CA (US); Raymond Lo, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/499,745

(22) Filed: Feb. 8, 2000

(51) Int. Cl.[7] .............................................. G06F 9/45
(52) U.S. Cl. ....................... 717/156; 717/151
(58) Field of Search ................................. 717/151, 156

(56) References Cited

U.S. PATENT DOCUMENTS

| | | | | |
|---|---|---|---|---|
| 4,667,290 A | * | 5/1987 | Goss et al. .................... | 713/1 |
| 4,763,255 A | * | 8/1988 | Hopkins et al. ............. | 717/153 |
| 4,951,195 A | * | 8/1990 | Fogg et al. ................... | 703/20 |
| 5,418,959 A | * | 5/1995 | Smith et al. ................. | 717/151 |
| 5,768,596 A | * | 6/1998 | Chow et al. ................. | 717/154 |
| 6,301,704 B1 | * | 10/2001 | Chow et al. ................. | 717/146 |

OTHER PUBLICATIONS

Ron Cytron et al., *ACM Transactions on Programming Languages and Systems*, Efficiently Computing Static Single Assignment Form and the Control Dependence Graph, vol. 13, No. 4, Oct., 1991, pp. 451–490.

* cited by examiner

*Primary Examiner*—Todd Ingberg
*Assistant Examiner*—William H. Wood
(74) *Attorney, Agent, or Firm*—Sterne, Kessler, Goldstein & Fox, P.L.L.C.

(57) ABSTRACT

A method and computer program product, within an optimizing compiler, for the global minimization of sign-extension and zero-extension operations in generated code during compilation. The method and computer program product allows, for example, 64-bit compilers targeting the Intel IA64 architecture to improve their SPECint benchmarks by reducing the number of sign-extension and zero-extension operations in the global and intra-procedural scope, thus, speeding up the execution of the compiled program.

9 Claims, 4 Drawing Sheets

METHOD AND COMPUTER PROGRAM PRODUCT FOR GLOBAL MINIMIZATION OF SIGN-EXTENSION AND ZERO-EXTENSION OPERATIONS

BACKGROUND OF THE INVENTION

1. Field of the Invention

The present invention relates generally to computer program (i.e., software) compilers and more particularly to optimizers in computer program compilers that perform sign-extension and zero-extension operation optimization.

2. Related Art

The Static Single Assignment Form (SSA) is a popular program representation in optimizing compilers, because it provides accurate use-definition (use-def) relationships among the program variables in a concise form. SSA is described in detail in R Cytron et al., *Efficiently Computing Static Single Assignment Form and the Control Dependence Graph*, ACM Trans. on Programming Languages and Systems, 13(4):451–490, October 1991 (hereinafter "Cytron et al."), which is incorporated herein by reference in its entirety.

The SSA form can be briefly described as a form where each definition of a variable is given a unique version, and different versions of the same variable can be regarded as different program variables. Each use of a variable version can only refer to a single reaching definition. When several definitions of a variable, $a_1, a_2, \ldots, a_m$, reach a common node (called a merging node) in the control flow graph of the program, a $\phi$ function assignment statement, $a_n = \phi(a_1, a_2, \ldots, a_m)$, is inserted to merge the variables into the definition of a new variable version $a_n$. Thus, the semantics of single reaching definitions are maintained.

Many efficient global optimization algorithms have been developed based on SSA. These optimizations, based on SSA, all share the common characteristic that they do not require traditional iterative data flow analysis in their solutions. They all take advantage of the sparse representation of SSA. In a sparse form, information associated with an object is represented only at places where it changes, or when the object actually occurs in the program. Because it does not replicate information over the entire program, a sparse representation conserves memory space. Thus, information can be propagated through the sparse representation in a smaller number of steps, speeding up most algorithms.

Among the optimizations based on SSA are dead code elimination, dead store elimination, constant propagation, value numbering, induction variable analysis, live range computation, and global code motion. Minimization of sign-extension and zero-extension operations, however, has not been addressed.

Modern programming languages like C and FORTRAN support integer data of various sizes and signage (i.e., either signed or unsigned). For example, using the C programming Language, one can declare an integer variable to be:

unsigned int i;

such that the variable i can hold values from 0 to 65,535 (assuming a machine where integers are 2 bytes (i.e., 16 bits)). One can also declare, however, an integer variable to be:

signed int i;

such that the variable i can hold values from −32,768 to 32,767 (also assuming a machine where integers are 2 bytes). Though the common sizes are 8 bits, 16 bits, 32 bits and 64 bits, any other size is possible. But the instruction architecture of a computer's central processor may not provide integer operations (e.g., +, −, *, /, and %) at each different bit size.

To represent negative numbers in binary within a computer, the "two's complement" representation is common to those skilled in the relevant art(s). In two's complement representation, each bit of the negative number being represented is first inverted (i.e., zeros are replaced with ones, and ones replaced with zeros). Then, a one (000 . . . 001 in binary) is added to avoid there being two representations for zero. For example, TABLE 1 shows the two's complement binary representation for the range of numbers from −3 to +3.

TABLE 1

Example of Two's Complement Representations

000 ... 00011 = +3
000 ... 00010 = +2
000 ... 00001 = +1
000 ... 00000 = 0
111 ... 11111 = −1
111 ... 11110 = −2
111 ... 11101 = −3

From TABLE 1 it can be seen that positive two's complement integers have the same binary representation as unsigned numbers.

Under the two's complement representation for integers, if integer operations are provided only for integer data of size n, it is possible to support signed integer types smaller than size n by providing the sign-extension operation, and to support unsigned integer types smaller than size n by providing the zero-extension operation. The sign-extension instruction specifies a bit position from which to sign-extend. For example, "SIGN_EXT 12" specifies that the sign bit is at bit position eleven, and all bits at position twelve and higher are to be set to the value of bit eleven. The zero-extension instruction specifies a bit position from which to zero-extend. For example, "ZERO_EXT 8" specifies that all bits at bit position eight and higher are to be set to zero.

As an example, suppose a program specifies a 12-bit addition operation on two signed integers that are each 12 bits in size. Further, suppose the underlying machine provides only registers that are 32 bits in size, and provides only the 32-bit addition operation. Before the 32-bit operation, the two 12-bit operands reside in two 32-bit registers, with their upper bits (i.e. those from bit 12 onwards) appropriately sign-extended. After the 32-bit addition, the result may be larger than what can be represented in 12 bits. Thus, it is necessary to execute a "SIGN_EXT 12" operation so as to truncate the result back into a signed 12-bit integer, in order to preserve the semantics of 12-bit addition (as opposed to 32-bit addition).

The "ZERO_EXT n" command is the same as the "SIGN_EXT n", but is more specific. It refers to extending with zeros only, which usually means a positive number. The 12 or 8 used in the examples above simply refers to the number of digits from right to left (least significant to most significant) that is counted before reaching the sign (positive or negative) bit. The least significant bit is referred to as bit zero.

The sign-extension and zero-extension operations provide the effect of truncation during arithmetic operations. This allows arithmetic operations to achieve correct results at smaller integer (i.e., bit) sizes despite the fact that these integer values reside in registers that are larger. Sign-extensions and zero-extensions also appear when user application programs contain type casts or truncation operations.

Typically, however, a processor may provide only 64-bit operations, although 32-bit is the most common integer size used. Thus, 32-bit integer code will perform sub-optimally. Therefore, what is needed is a method and computer program product, within an optimizing compiler, for the global minimization of sign-extension and zero-extension operations in generated code during compilation.

SUMMARY OF THE INVENTION

The present invention is directed to a method and computer program product for the global minimization of sign-extension and zero-extension operations in generated code during compilation.

The method and computer program of the present invention involve accessing a static single assignment (SSA) representation of a computer program and performing a bitwise liveness analysis of the SSA representation of the computer program in order to identify all sign-extension and zero-extension operations that affect only the dead bits. Then, a deletion of all sign-extension and zero-extension operations within the computer program which have been identified as useless is performed which allows an optimizing compiler to produce more efficient executable program code from the SSA representation.

An advantage of the present invention is that 64-bit compilers can improve the SPECint benchmarks compiled for the Intel IA64 architecture by reducing the number of sign-extension and zero-extension operations in the global and intra-procedural scope, thus, speeding up the execution of the compiled program.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Table of Contents

Figure 1:
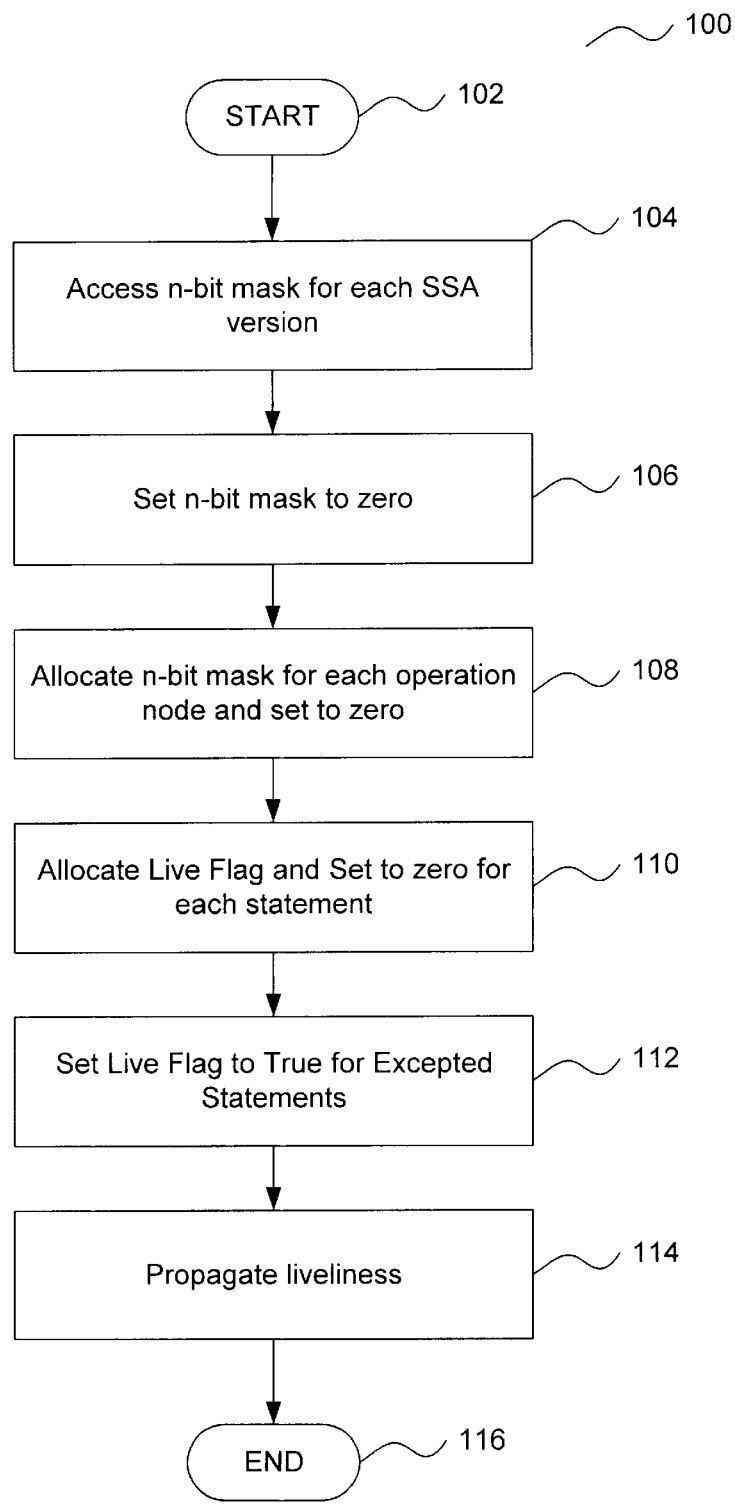
FIG. 1 is a flowchart representing an example embodiment of the Bitwise Liveness Analysis phase of the present invention's global minimization of sign-extension and zero-extension operations.

I. Overview
    II. Detailed Operation
    A. Bitwise Liveness Analysis Phase
    B. Deletion of Extension Operations Phase
III. Environment
IV. Conclusion

I. Overview

This present invention addresses compiler methods that minimize the number of sign-extension and zero-extension operations in the global and intra-procedural scope, thus speeding up the execution of the compiled program.

In the approach of the present invention, a global optimizing compiler deals with one procedure at a time. The program source code of the procedure is first represented in SSA form. In a preferred embodiment of the present invention, the program source code would first be converted into Hashed SSA (HSSA) form. HSSA, a uniform SSA representation of all the scalar and indirect memory operations of a program based on global value numbering, is disclosed and described in detail in commonly-assigned U.S. Pat. No. 5,768,596 issued to Chow et al. Other forms of SSA representation, however, are possible.

Once the source code of the program is represented in SSA form, the SSA program representation reveals exactly how values are computed and assigned to the various program variables. Further, the SSA form reveals explicit use-def relationships among the program variables. Based on this SSA representation of the program, an optimizing compiler may perform an analysis on the individual bits of the various program variables. The results of this analysis allows the optimizing compiler to determine sign-extension and zero-extension operations that can be deleted (i.e., removed).

In general, a sign-extension or zero-extension operations can be deleted due to one of two reasons: (1) Dead Bits; or (2) Redundant Operations.

First, "Dead Bits" refer to those bits within the various program variables who are not "LIVE." As will be appreciated by one skilled in the relevant art(s), "LIVE" source code statements (i.e., those who are not labeled "dead," "unreachable," or "ineffectual" code), as explained in Cytron et al., refer to: (a) statements that are assumed to affect program output, such as input-output (I/O) statements, assignment statements to reference parameters, or calls to routines that have side effects; (b) assignment statements who are referred to by other statements previously marked "LIVE"; or (c) conditional branches who are referred to by other statements previously marked "LIVE." Thus, performing the sign-extension or zero-extension operation that affects only dead bits of variables will not affect the result of the program. Therefore, these sign-extension or zero-extension operations can be removed resulting in an optimized compiled program.

Second, "Redundant Operations" refer to sign-extension or zero-extension operations that have no net effect because the bits they would operate upon already have the intended value before performing such sign-extension or zero-extension operation. That is, sign-extension or zero-extension operations may be eliminated where the bits they would operate upon already have the intended value before performing the sign-extension or zero-extension operation.

Therefore, because these sign-extension or zero-extension operations would perform no useful work, they can be removed. These removals result in an optimized compiled program.

II. Detailed Operation

In a preferred embodiment, the global minimization of sign-extension and zero-extension operations of the present invention consists of two phases applied in sequence: a Bitwise Liveness Analysis phase 100; and a Deletion of Extension Operations phase 200. These two phases are described in detail below.

A. Bitwise Liveness Analysis

Referring to FIG. 1, the Bitwise Liveness Analysis phase 100 according to a preferred embodiment of the present invention, is shown. As suggested above, this is the first phase of the global minimization of sign-extension and zero-extension operations method and computer program product of the present invention.

If, for example, a software environment where the largest integer size of 64 bits is assumed, an optimizing compiler will allocate a 64-bit mask for each SSA version (i.e., each variable definition) in the program. At the end of this Bitwise Liveness Analysis phase, the 64-bit mask will describe whether each bit of each SSA version is "LIVE" (value=1) or "dead" (value=0). Thus, the method of the present invention can be thought of as an extension to the SSA-based Dead Code Elimination algorithm described in Section 7.1 of Cytron et al.

The Bitwise Liveness Analysis phase 100 begins at step 102 with control passing immediately to step 104. In step 104, the SSA 64-bit mask for each SSA version is accessed. In step 106, it is initially assumed that all SSA versions are dead by setting their bit masks to 0. Then, in step 108, a 64-bit mask, initialized to zero, is allocated for each operation node in the expression trees.

In step 110, a LIVE flag for each statement of the program is allocated and initially set it to FALSE. For statements that are assignments to SSA versions, the 64-bit masks for the SSA versions are used instead of the LIVE flag because the unit of liveness is each bit in the variable. As mentioned previously, all the LIVE flags are initially set to FALSE. In step 112, however, the LIVE flags are set to TRUE for "excepted" statements. "Excepted" statements include those statements trivially known to affect program output, such as I/O statements, statements that return the value of a function, or statements that are procedure calls which have side effects.

In step 114, the "liveness" of each program statement is propagated as follows: (1) if any statement in a basic block X is LIVE, the conditional branch statement in basic blocks that block X is control dependent on is marked LIVE; and (2) for any statement that is LIVE, the liveness is propagated to the 64-bit masks of the SSA versions (or variables) used in the statement. If the statement references an expression tree, the liveness is first propagated to the 64-bit mask of the operation node corresponding to the root of the tree. From each operation node, the liveness is propagated to its operand nodes.

In essence, during each propagation step described above, the nature of the operation is taken into account and only the bits of the operand that affect the result of the operation are made LIVE. Eventually, the propagation will reach the leaves of the expression tree. If the leaf is an SSA version, following the use-def edge to get to the statement that assigns to the SSA version, and continue the liveness propagation starting with the live bits of the SSA version. Propagation is discontinued whenever no new liveness is found. Bitwise Liveness Analysis phase 100 ends as indicated by step 116.

B. Deletion of Extension Operations

Figure 2:
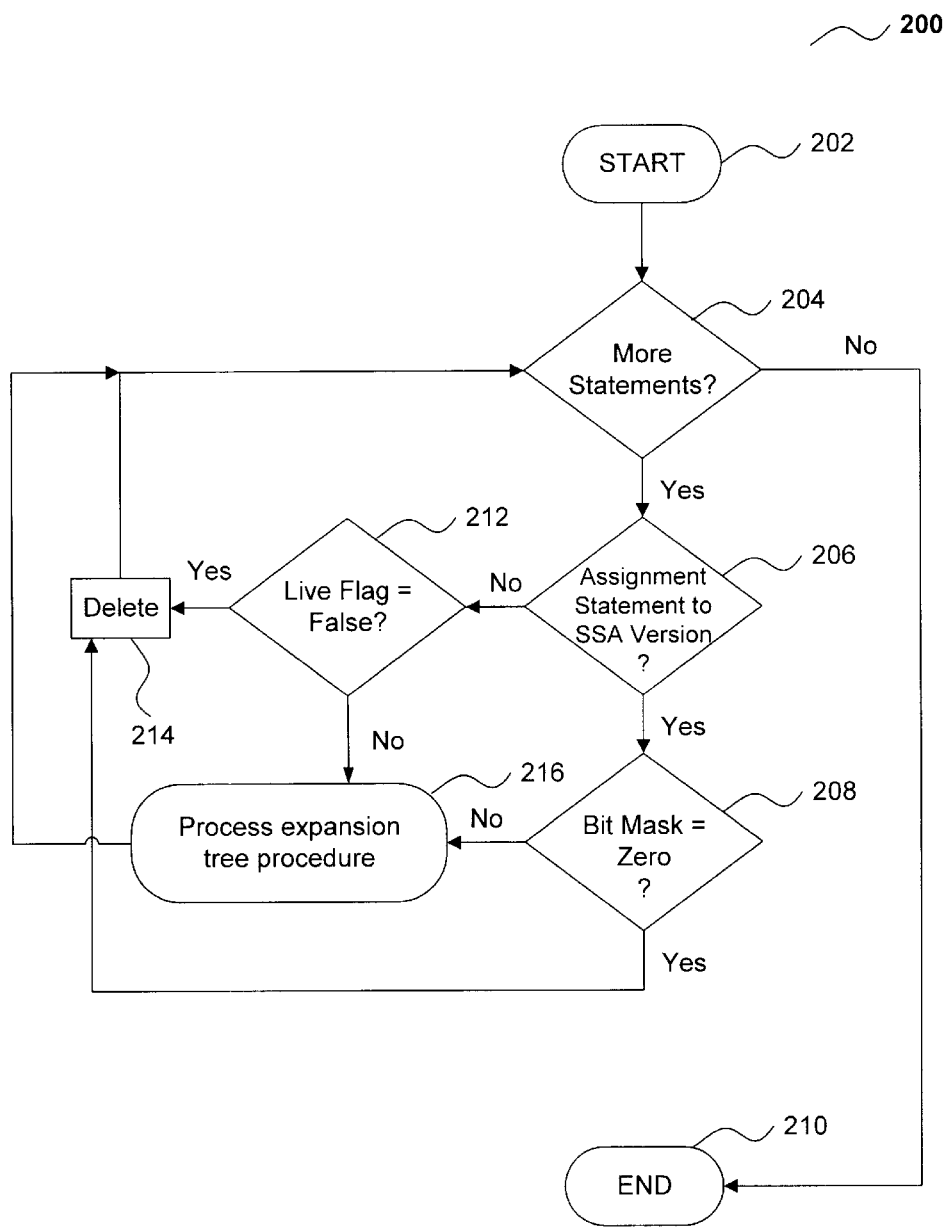
FIG. 2 is a flowchart representing an example embodiment of the Deletion of Extension Operations phase of the present invention's global minimization of sign-extension and zero-extension operations.

Referring to FIG. 2, the Deletion of Extension Operations phase 200, according to a preferred embodiment of the present invention, is shown. As suggested above, this is the second (and last) phase of the global minimization of sign-extension and zero-extension operations method and computer program product of the present invention (i.e., this phase is performed after steps 102–116 of FIG. 1).

The Deletion of Extension Operations phase 200 begins at step 202 with control passing immediately to step 204. Step 204 indicates that the Deletion of Extension Operations phase 200 involves passing over the program code once and visiting all statements.

In step 206, it is determined whether a statement is an assignment statement to an SSA version. If so, the assignment statement can be deleted if the 64-bit mask is zero as indicated by steps 208 and 214. If it is determined, in step 206, that the statement is not an assignment statement to an SSA version, Deletion of Extension Operations phase 200 proceeds to step 212.

In step 212, it is determined if the statements LIVE flag is equal to FALSE (i.e., zero). If so, the statement is deleted in step 214. Else, if the statement's LIVE flag is equal to TRUE (i.e., one), the expression trees computed in the statement are processed by a Process-Expression-Tree 216 procedure. Process-Expression-Tree 216 is a recursive routine, in which each invocation processes one node of the tree. It is first invoked with the root of the tree. If necessary, at the end of Process-Expression-Tree 216, it will invoke itself for each operand of the node. The effect is a top-down pre-order traversal of the expression tree nodes.

Figure 3:
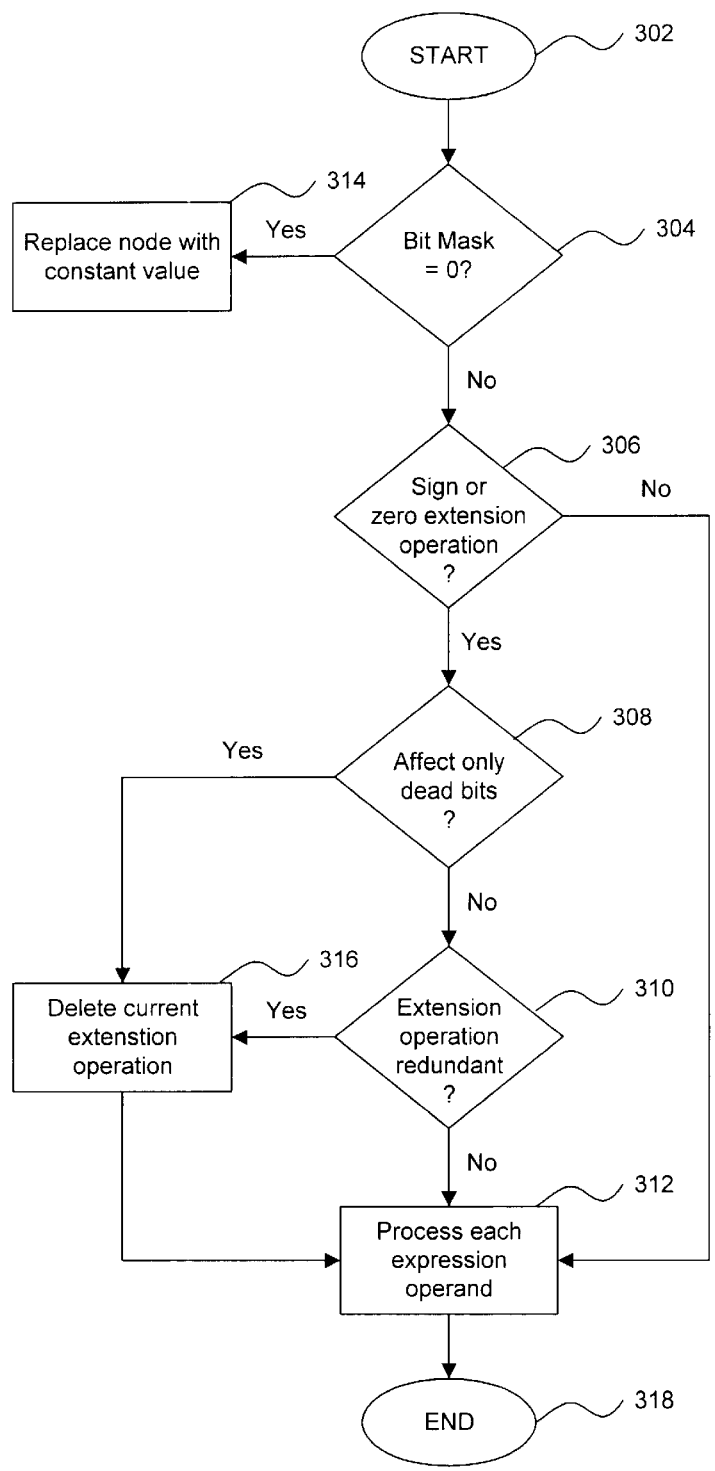
FIG. 3 is a flowchart representing an example embodiment of the Process-Expression-Tree procedure which is performed during the Deletion of Extension Operations phase of the present invention's global minimization of sign-extension and zero-extension operations.

Referring to FIG. 3, a flowchart representing an example embodiment of the Process-Expression-Tree procedure 216 is shown. Process-Expression-Tree 216 begins at step 302 with control passing immediately to step 304. In step 304 it is determined in if the 64-bit mask of a tree node is equal to zero. If so, the tree node does not need to be computed and thus, in step 314, the tree node is replaced by the use of the integer constant zero (0) or any other value that incurs no computation cost. That is, the tree node can be replaced with any pre-determined value which can be inexpensively generated (depending on the architecture of the machine in which the present invention is operating).

If step 304 determines that the 64-bit mask of the tree node is not equal to zero, step 306 checks if the node is a sign-extension or zero-extension operation. If it is not, Process-Expression-Tree 216 proceeds to step 312 where it invokes itself for each operand of the node. If step 306 determines that the node is a sign-extension or zero-extension operation, step 308 checks if the extension operation affects only dead bits in the current tree node (i.e., "Dead Bits"). If it only affects dead bits, the extension operation can be deleted. The deletion is done in step 316, after which Process-Expression-Tree 216 proceeds to step 312 to continue processing each operand of the node.

If the dead bits condition is not satisfied in step 308, it moves on to step 310, in which the operand of the sign-extension or zero-extension operation is analyzed to determine if the bits affected are already of the intended values at the operand (i.e., a "Redundant Operation"). If this is true, the sign-extension or zero-extension operation is redundant, and can be deleted as indicated by step 316. Examples of these Redundant Operations are: (i) The operand is a boolean value, so that all the bits from bit one and higher up are known to be zero; (ii) The operand is an integer constant, such that the values of all its bits prior to the extension operation are known; (iii) The operand is a load from memory, so depending on whether it is a signed load or unsigned load, the higher bits in excess of the size of the memory location are either sign-extended or zero-extended. For signed loads, the high order bits will be sign-extended; for unsigned loads, the high order bits will be zero-extended; (iv) The operand is another sign or zero extension operation; and (v) The operand is another SSA version. For redundant operations that fall in category (v), Process-Expression-Tree 216 follows its use-def edge to its definition, and then applies the same analysis to its assigned value as exemplified by (i) to (v).

Process-Expression-Tree procedure 216 then ends as indicated by step 318. Consequently, Deletion of Extension Operations phase 200 ends (and thus, the global minimization of sign-extension and zero-extension operations of the present invention) once the program code is passed over and all statements have been visited as indicated by step 204 and 210 in FIG. 2.

III. Environment

Figure 4:
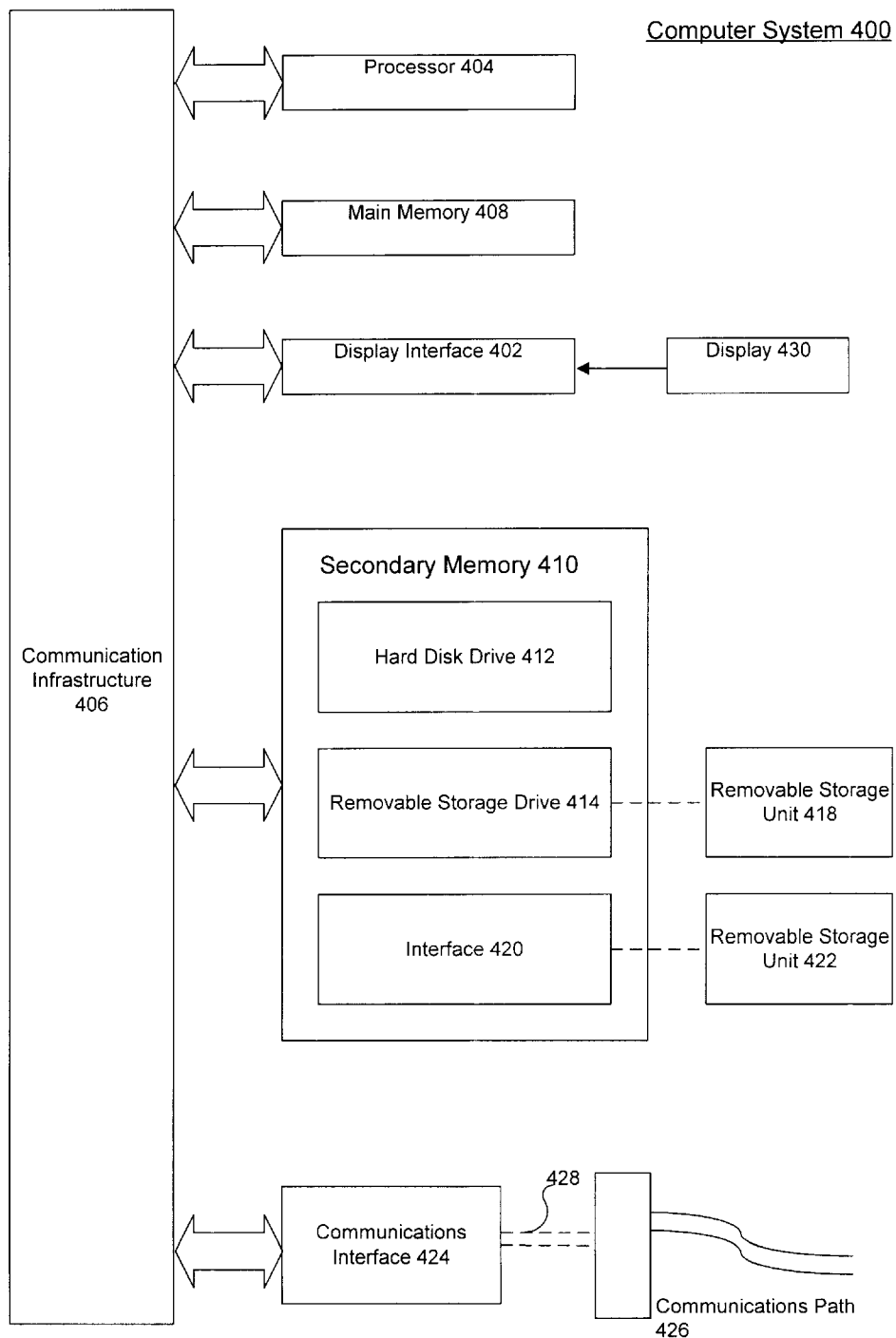
FIG. 4 is a block diagram of an example computer system for implementing the present invention.

In general, the present invention may be implemented in any compiler running on any machine, including, but not limited to, the MIPSpro compiler targeting the MIPS R10000 microprocessor or the Intel IA64 architecture. The present invention (i.e., Bitwise Liveness Analysis 100, Deletion of Extension Operations 200, or any parts thereof) may be implemented using hardware, software or a combination thereof and may be implemented in a computer system or other processing system. In fact, in one embodiment, the invention is directed toward one or more computer systems capable of carrying out the functionality described herein. An example of a computer system 400 is shown in FIG. 4. The computer system 400 represents any single or multi-processor computer. The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 400 can include a display interface 405 that forwards graphics, text, and other data from the communication infrastructure 402 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a phone line, a cellular phone link, an RF link and other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400. The invention is directed to such computer program products.

Computer programs (also called computer control logic) are stored in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. For example, although the foregoing description addresses the invention as an intra-procedural optimization, to one skilled in the art, the invention can easily be extended to be applied inter-procedurally for even greater optimization effect.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for global minimization of sign-extension and zero-extension operations for static single assignment (SSA) variables, within an optimizing compiler, in generated code during compilation, comprising:
   (1) accessing an SSA representation of a computer program including SSA variable versions;
   (2) performing a bitwise liveness analysis of the SSA variable versions in order to identify dead bits in the SSA variable versions and expression operations; and
   (3) performing a deletion of all sign-extension and zero-extension operations within said computer program which have been identified by said bitwise liveness analysis as either: (a) affecting only dead bits; or (b) having no effect because the affected bits already have their intended value prior to the sign-extension or zero-extension operation.

2. The method of claim 1, wherein step (2) comprises the steps of:
   (a) initializing an n-bit mask to zero for each SSA version within said SSA representation;
   (b) initializing an n-bit mask to zero for each operation node in the expression tree of said SSA representation;
   (c) allocating a live flag for each statement in said computer program and initializing said live flag to false;
   (d) setting said live flag to true for each of said statements in said computer program that are excepted; and
   (e) propagating down said SSA representation of said computer program wherein bits within said n-bit mask of said operation node are made live when such bits affect the result of such said operation node.

3. The method of claim 2, wherein said excepted statements of step (d) comprise any one of the following:
   (i) statements of said computer program that affect the output of said computer program;
   (ii) statements of said computer program that return the value of a function; and
   (iii) statements of said computer program that are procedure calls which have side effects.

4. The method of claim 2, wherein step (3) comprises the steps of:
   (a) deleting each statement of said computer program when said statement is an assignment statement to an SSA version, and said n-bit mask is equal to zero;
   (b) deleting each statement of said computer program when said live flag is false;
   (c) replacing each of said operation node with a pre-determined zero cost value when said n-bit mask associated with said operation node is equal to zero;
   (d) deleting each of said operation node when said node is a sign-extension or zero-extension operation and the bits affected by said operation are not live; and
   (e) deleting each of said operation node when said node is a sign-extension or zero-extension operation and are redundant.

5. The method of claim 4, wherein said pre-determined zero cost value is zero.

6. The method of claim 4, wherein said n-bit mask is a 64-bit mask when the largest integer size supported in the machine on which said computer program is being compiled is 64 bits.

7. A computer program product comprising a computer usable medium having computer readable program code means embodied in said medium for causing an application program to execute on a computer for global minimization of sign-extension and zero-extension operations for static single assignment (SSA) variables, within an optimizing compiler, in generated code during compilation, said computer readable program code means comprising:
   first computer readable program code means for causing the computer to access an SSA representation of a computer program including SSA variable versions;
   second computer readable program code means for causing the computer to perform a bitwise liveness analysis of the SSA variable versions in order to identify dead bits in the SSA variable versions and expression operations; and
   third computer readable program code means for causing the computer to perform a deletion of all sign-extension and zero-extension operations within said computer program which have been identified by said bitwise liveness analysis as either: (a) affecting only dead bits; or (b) having no effect because the affected bits already have their intended value prior to the sign-extension or zero-extension operation.

8. The computer program product of claim 7, wherein said second computer readable program code means comprises:
   a fourth computer readable program code means for causing the computer to initialize an n-bit mask to zero for each SSA version within said SSA representation;
   a fifth computer readable program code means for causing the computer to initialize an n-bit mask to zero for each operation node in the expression tree of said SSA representation;
   a sixth computer readable program code means for causing the computer to allocate a live flag for each statement in said computer program and initializing said live flag to false;
   a seventh computer readable program code means for causing the computer to set said live flag to true for each of said statements in said computer program that are excepted; and
   an eighth computer readable program code means for causing the computer to propagate down said SSA representation of said computer program wherein bits within said n-bit mask of said operation node are made live when such bits affect the result of such said operation node.

9. The computer program product of claim 8, wherein said third computer readable program code means comprises:
   a ninth computer readable program code means for causing the computer to delete each statement of said computer program when said statement is an assignment statement to an SSA version, and said n-bit mask is equal to zero;
   a tenth computer readable program code means for causing the computer to delete each statement of said computer program when said live flag is false;
   an eleventh computer readable program code means for causing the computer to replace each of said operation node with a pre-determined zero cost value when said n-bit mask associated with said operation node is equal to zero;
   a twelfth computer readable program code means for causing the computer to delete each of said operation node when said node is a sign-extension or zero-extension operation and the bits affected by said operation are not live; and a thirteenth computer readable program code means for causing the computer to delete each of said operation node when said node is a sign-extension or zero-extension operation and are redundant.

* * * * *